United States Patent [19]

Ackeret

[11] 4,125,064
[45] Nov. 14, 1978

[54] JUICE SQUEEZER FOR CITRUS FRUITS
[75] Inventor: Peter Ackeret, Kusnacht, Switzerland
[73] Assignee: Zyliss Zysset AG, Lyss, Switzerland
[21] Appl. No.: 730,294
[22] Filed: Oct. 6, 1976
[30] Foreign Application Priority Data
Aug. 6, 1976 [DE] Fed. Rep. of Germany ....... 2635577
[51] Int. Cl.² .............................................. A47J 19/02
[52] U.S. Cl. ........................................ 99/508; 99/505
[58] Field of Search ................. 99/501, 503, 505–508, 99/513; 100/112, 213; 210/413, 414
[56] References Cited
U.S. PATENT DOCUMENTS

| 1,861,426 | 5/1932 | Davis | 99/503 |
| 1,957,346 | 5/1934 | Larson | 99/505 |
| 2,057,227 | 10/1936 | Blum | 99/505 |
| 2,087,979 | 7/1937 | Kennedy | 99/505 |
| 2,291,028 | 7/1942 | Cummins | 99/505 |
| 3,575,223 | 4/1971 | Hickel | 99/501 |

FOREIGN PATENT DOCUMENTS 1,323,666  3/1963  France ....................... 99/501

Primary Examiner—Harvey C. Hornsby
Assistant Examiner—John M. Jillions
Attorney, Agent, or Firm—H. Dale Palmatier

[57] ABSTRACT

A juice squeezer for citrus fruits including a base housing or receptacle, a fruit flesh strainer over the receptacle, a squeezer cone above the strainer, and a cleaning element overlying the strainer, the strainer and cleaning element having relative movement with respect to each other.

31 Claims, 24 Drawing Figures

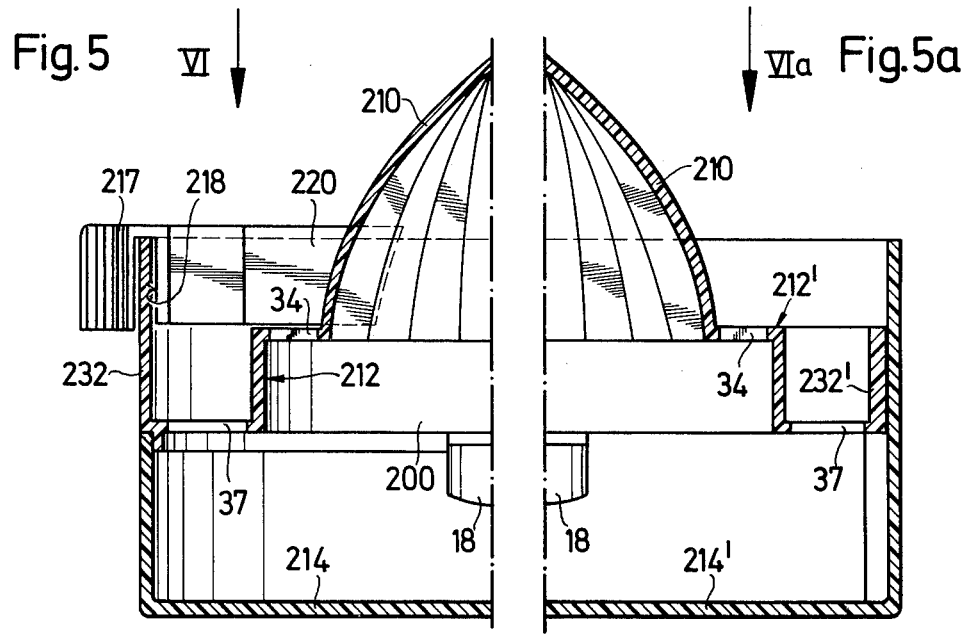
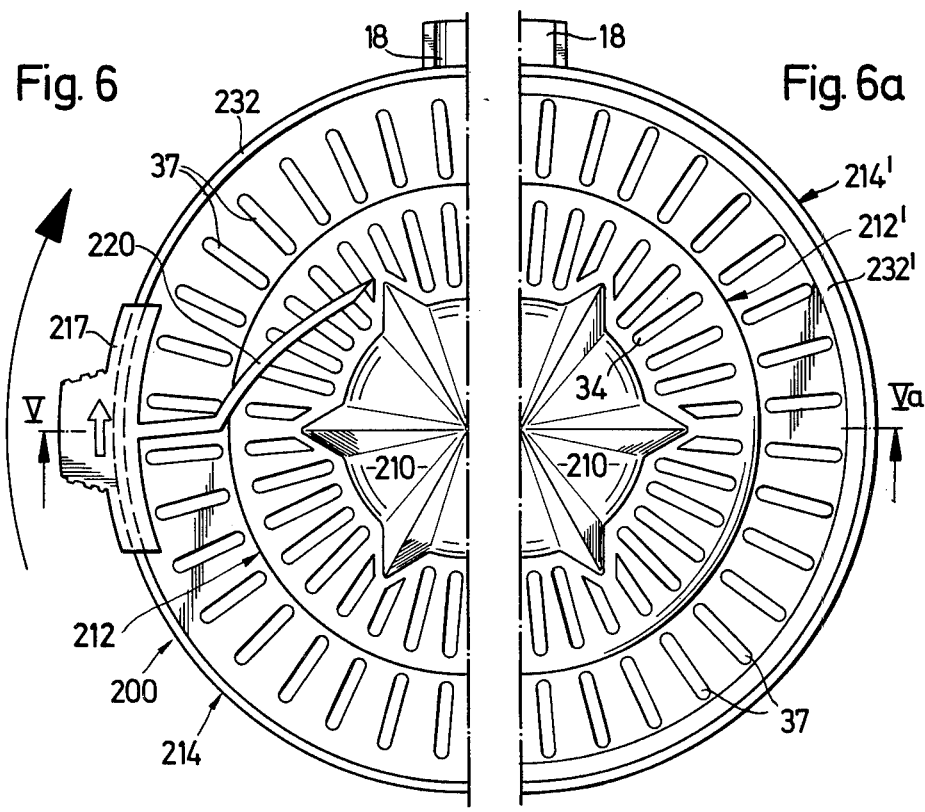

U.S. Patent    Nov. 14, 1978    Sheet 7 of 11    4,125,064
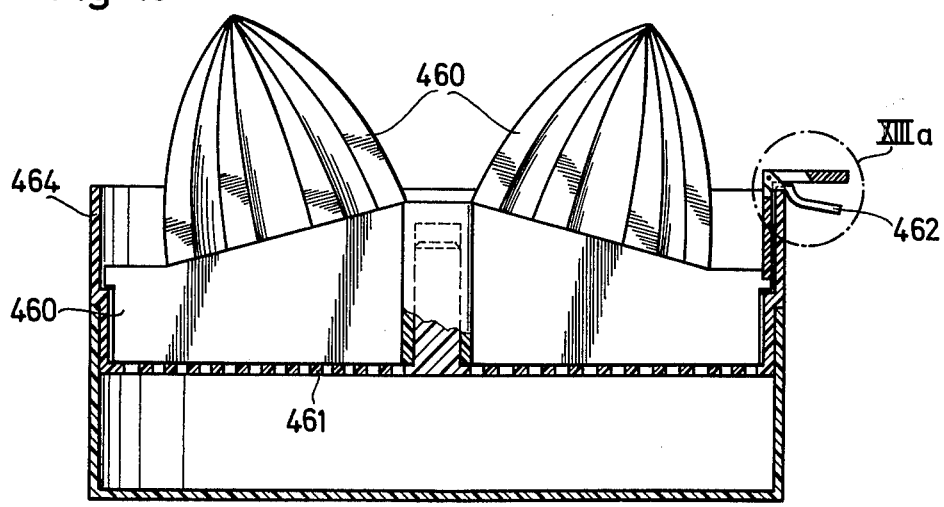
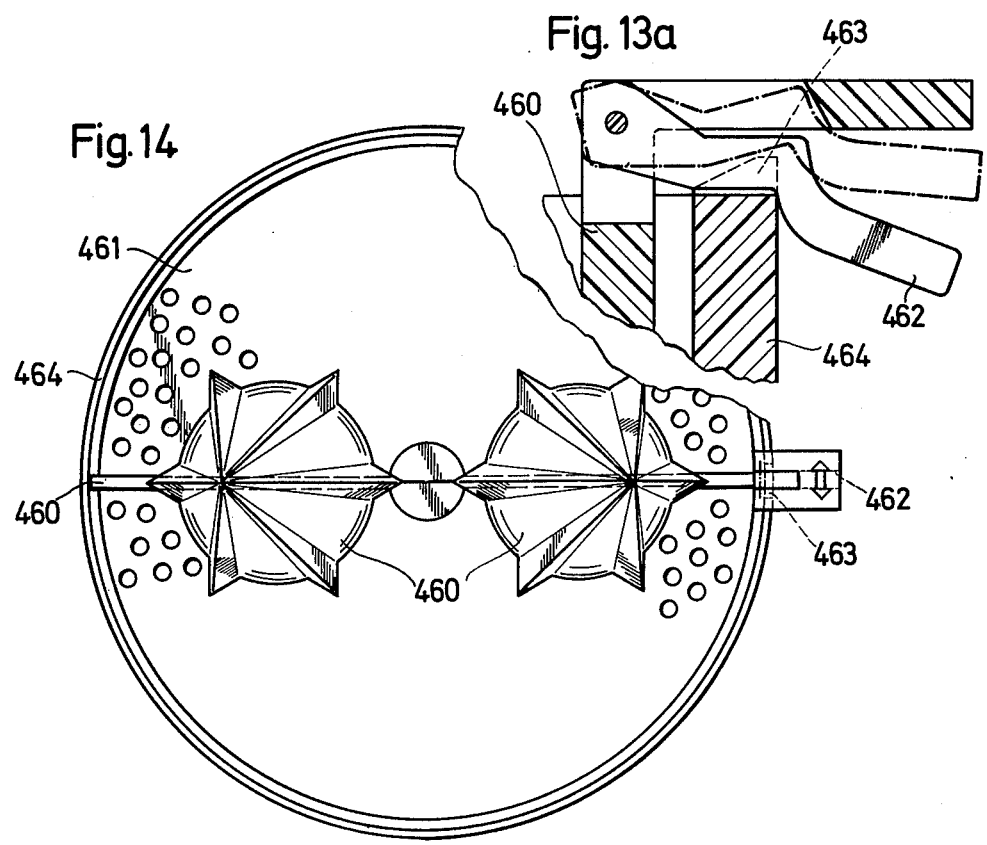

JUICE SQUEEZER FOR CITRUS FRUITS

This invention relates to a juice squeezer for citrus fruits.

Juice squeezers for citrus fruits basically consist of a squeezer unit of an approximately conical shape and a strainer or riddle. More precisely the squeezer unit has a shape of, for example, a half ellipsoid, but hereinafter the squeezer unit will be referred to as a "cone" to simplify matters. The strainer or riddle separates the fruit flesh, which is squeezed out with the juice, from the juice which is to be used. The simplest squeezers of this kind consist of one-piece plastics part, namely a kind of dish with a cone placed on it and with a shaped pouring lip, in front of which there is a strainer. More luxurious models have two parts, the dish being constructed as a strainer and resting on a collecting vessel for the juice. Modern juice squeezers are equipped with a motor, with which the cone is driven in a rotary manner.

All known juice squeezers have the disadvantage that the fruit flesh pressed out with the juice collects in front of the riddle or on the apertures in the strainer, and blocks these up. After only a few fruit halves have been squeezed the strainer therefore has to be cleaned.

It is the aim of the invention to provide a juice squeezer for citrus fruits in which large quantities of fruit can be squeezed before the fruit flesh which accumulates thereby needs to be removed from the squeezer.

This problem is solved according to the invention by providing at least one cleaning element to remove from the area of the squeezer body from which the juice drains away the fruit flesh held back by the strainer, wherein the cleaning element; and the strainer are disposed so that they can move relative to one another. Accordingly, the juice squeezer already has one integrated unit, which serves for cleaning the strainer. This leads to a considerable saving of time in the case of motor-driven squeezers in which from the start a considerable through-put must be reckoned with anyway, but it also proves useful with simple, manual squeezers for domestic use. The juice then no longer flows onto the fruit flesh, lying on the strainer, which would absorb a part of the juice, but passes through the cleaned strainer directly into the juice container. The yield of juice is therefore improved as well.

Several embodiments of fruit squeezers, each constructed in accordance with the invention, will now be described, by way of example, with reference to the accompanying drawings, in which:

FIGS. 5 and 5a show a third embodiment broken away in axial section;

Figure 7:
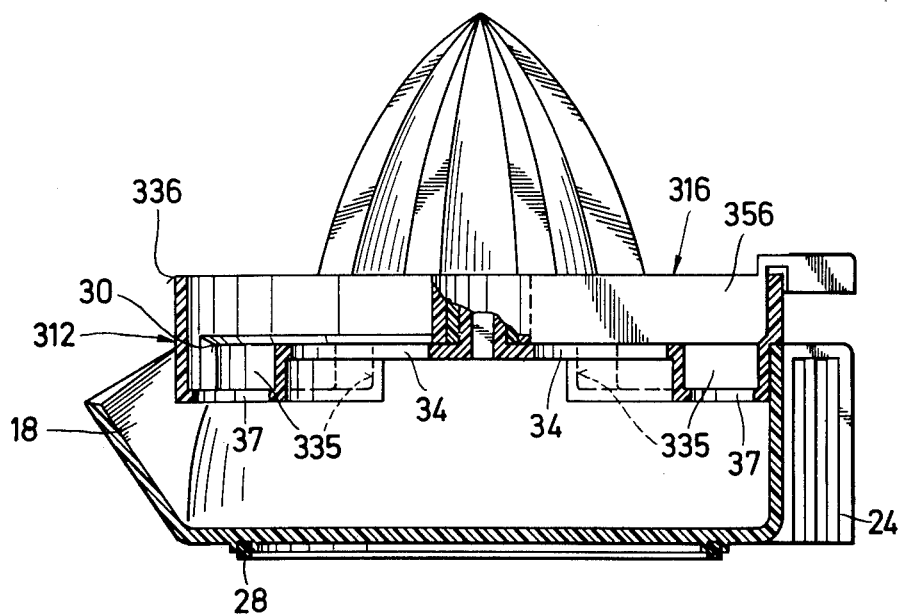
Figure 8:
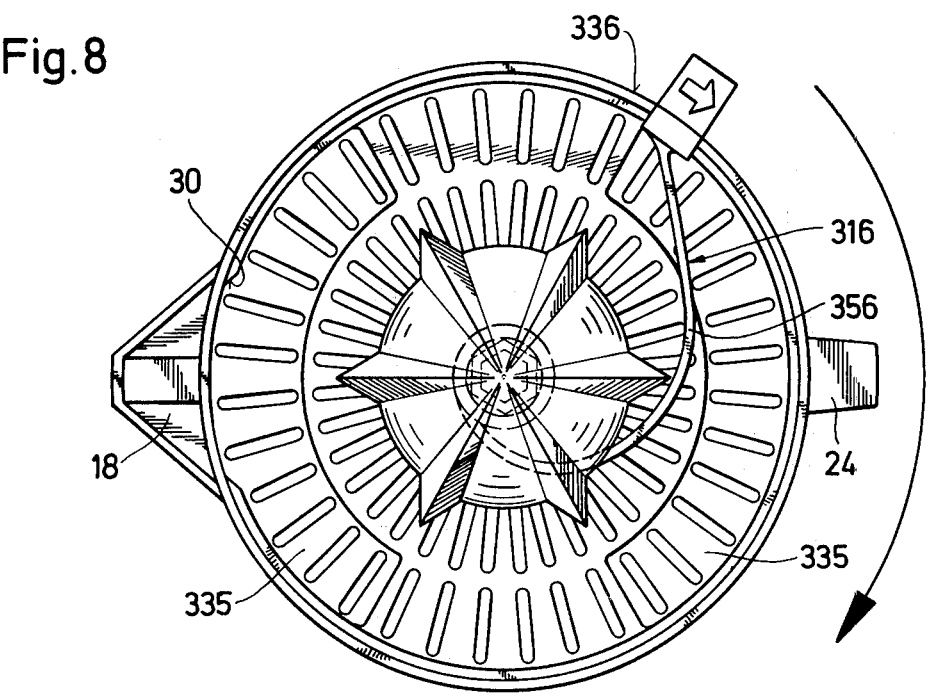
Figure 9:
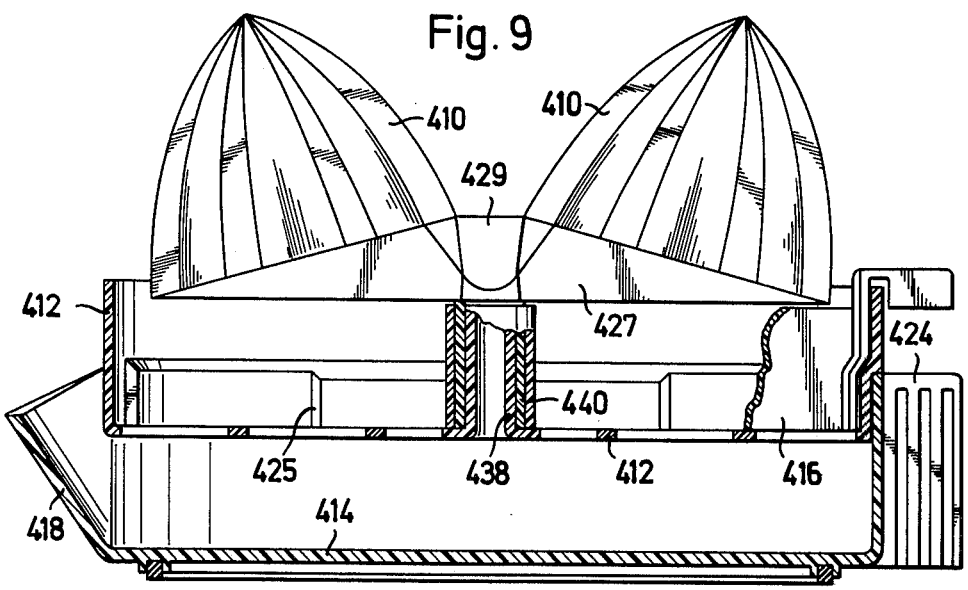
Figure 10:
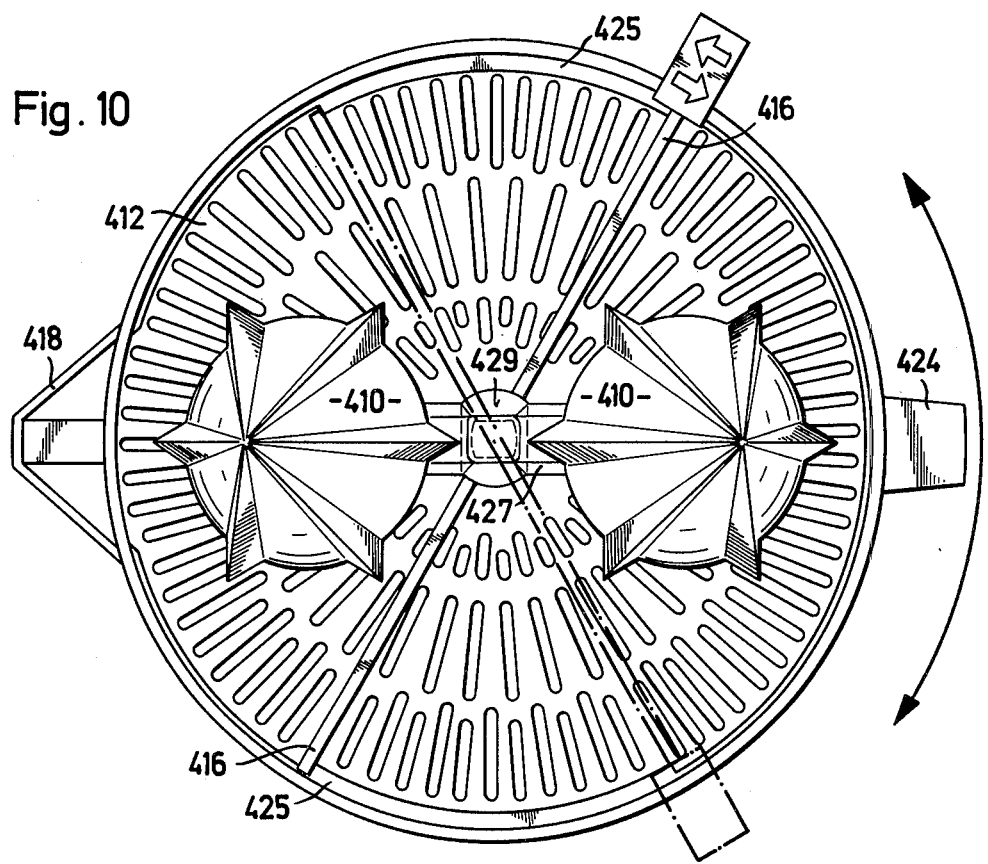
Figure 11:
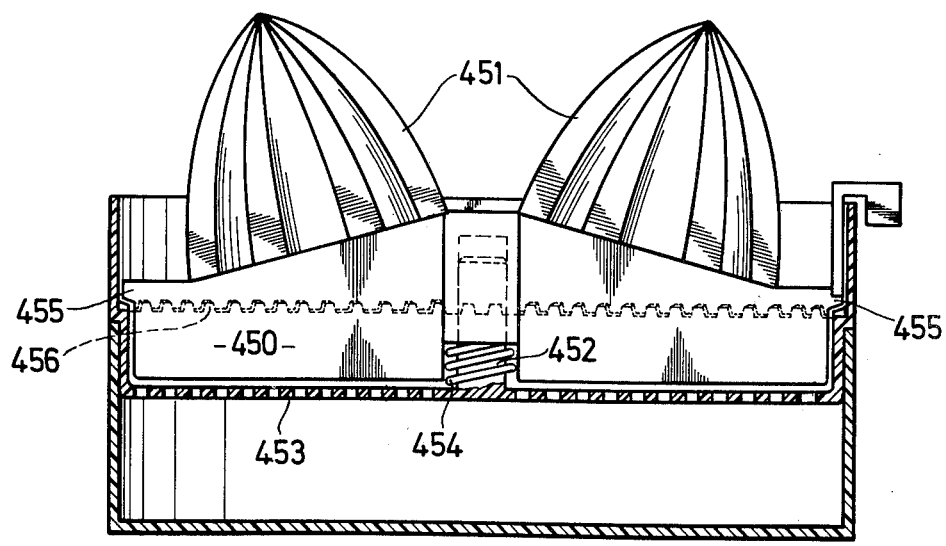
Figure 12:
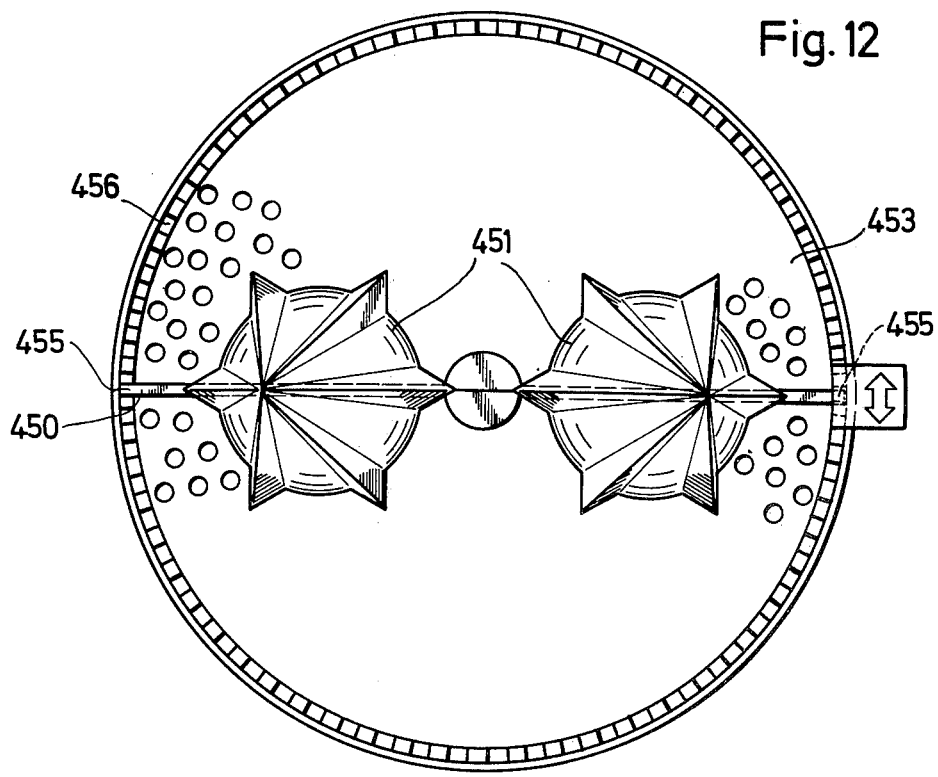
Figure 15:
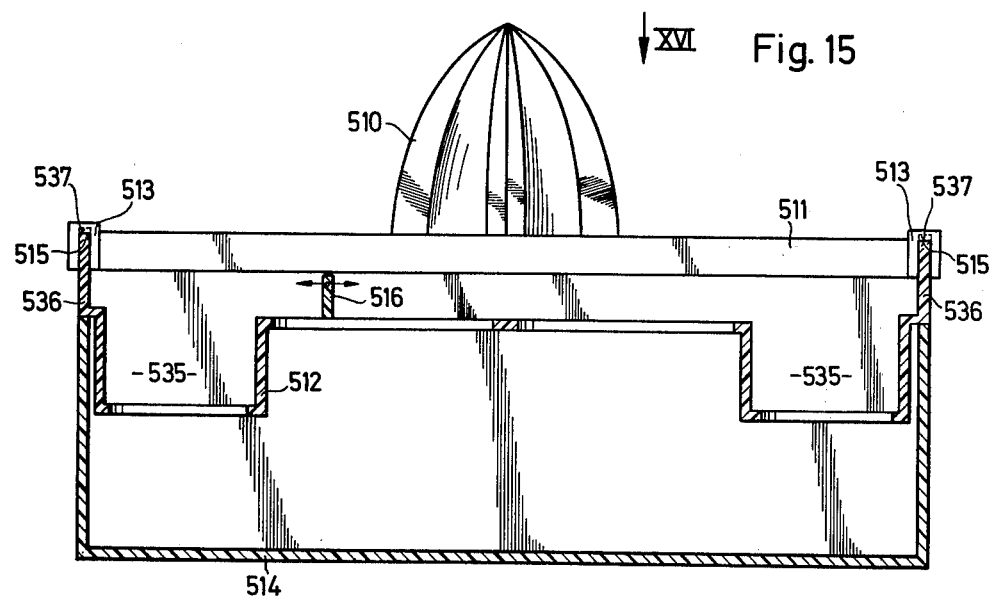
Figure 16:
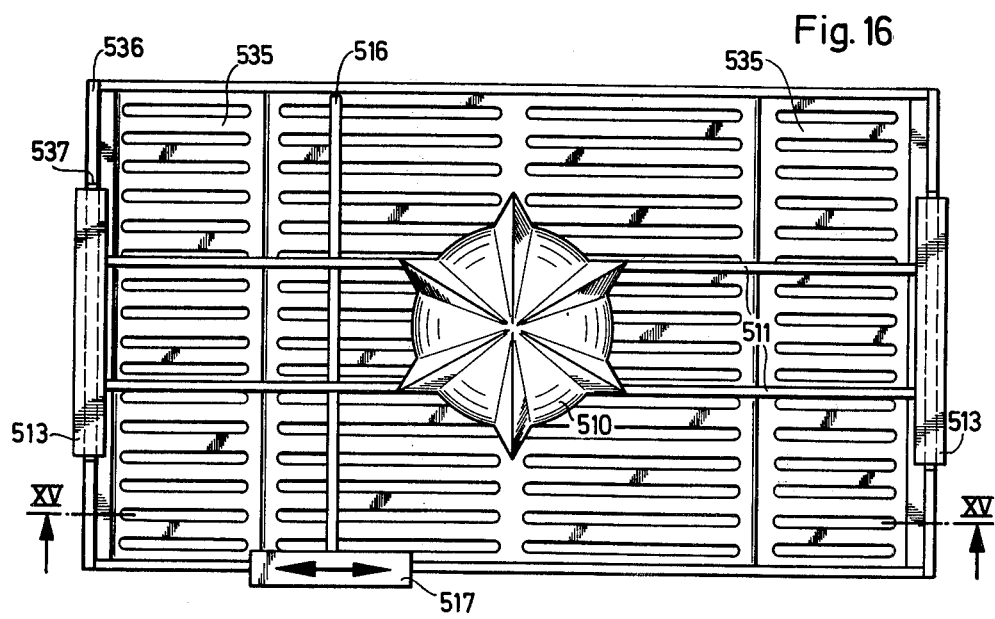
Figure 17:
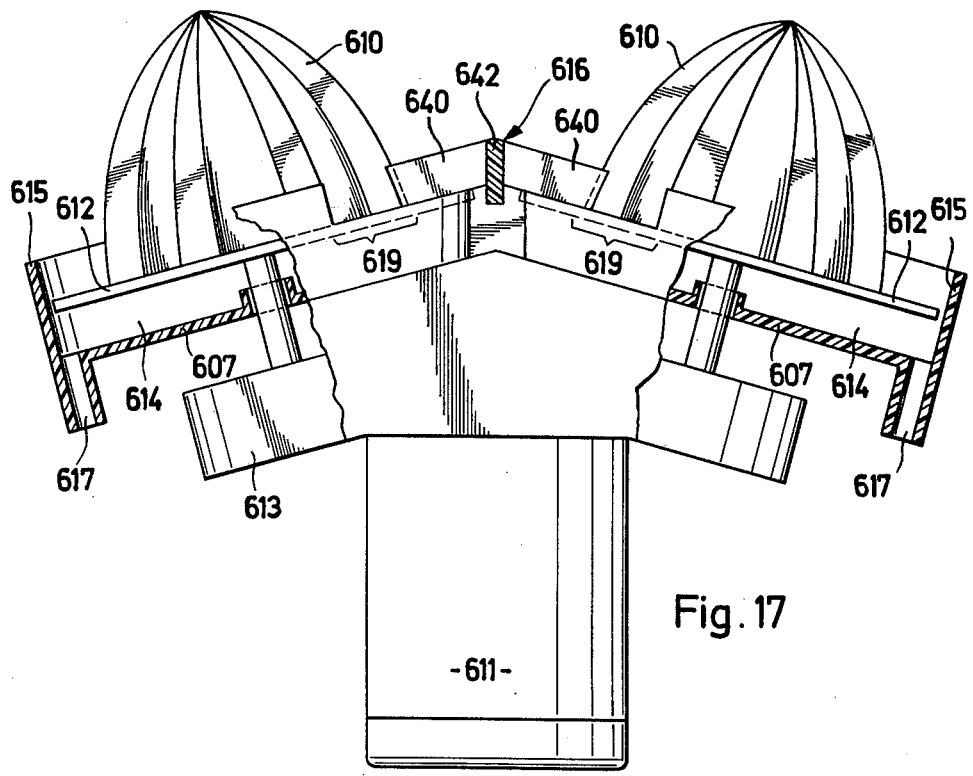
Figure 18:
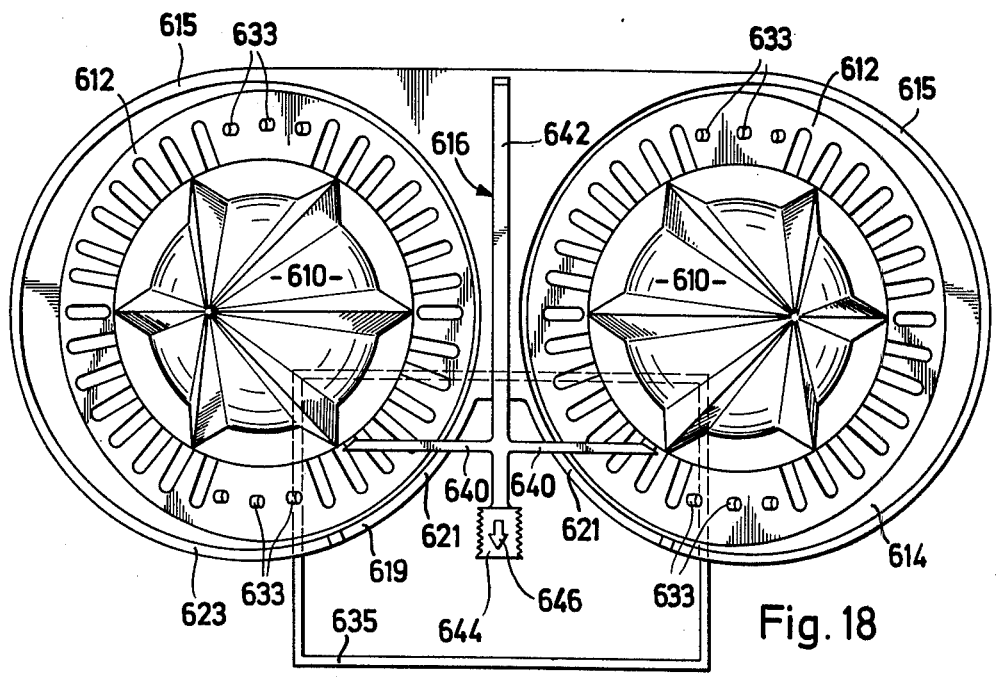
Figure 19:
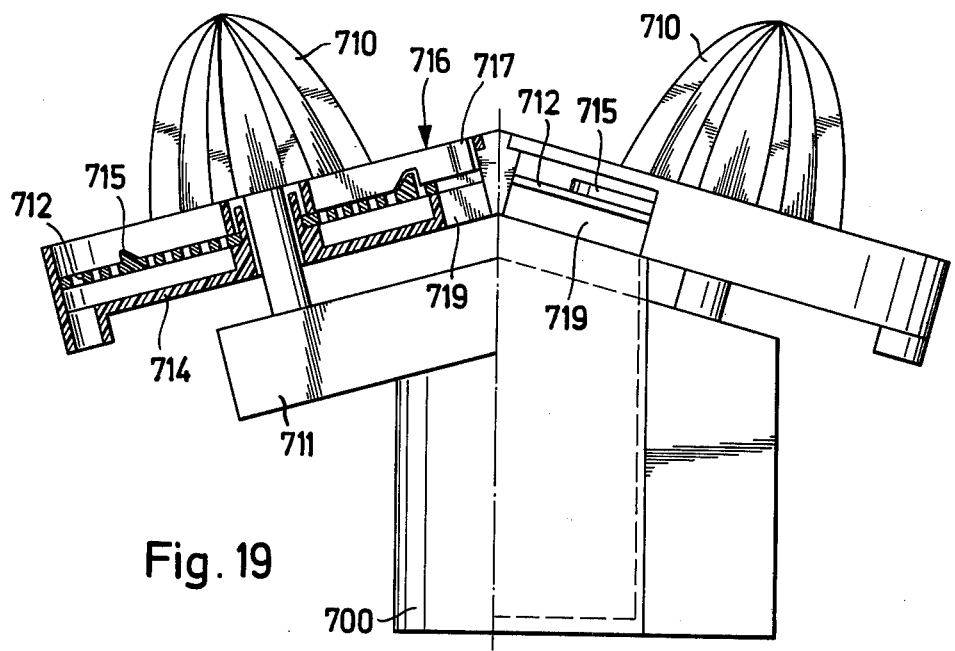
Figure 20:
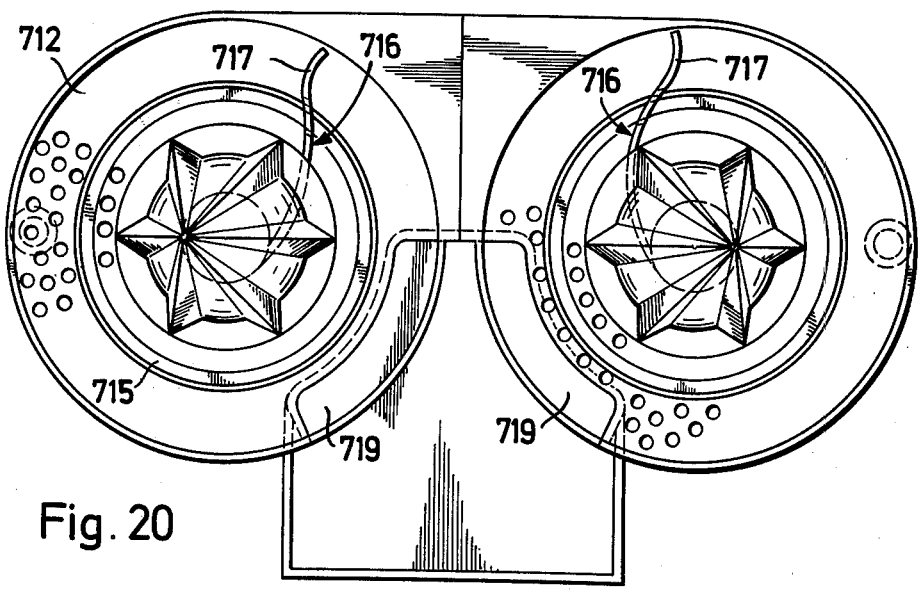

FIGS. 6 and 6a, respectively, are plan views of the squeezers of FIG. 5 and 5a, respectively;

FIG. 7 shows a fourth embodiment in partial axial section;

FIG. 8 is a plan view of the squeezer of FIG. 7;

FIG. 9 shows a fifth embodiment in partial axial section;

FIG. 10 is a plan view of the squeezer of FIG. 9;

FIG. 11 is a sixth embodiment in partial axial section;

FIG. 12 is a plan view of the squeezer of FIG. 11;

FIG. 13 shows a seventh embodiment in partial axial section;

FIG. 13a shows, in larger scale, a detail of FIG. 13;

FIG. 14 is a plan view of the squeezer of FIG. 13;

FIG. 15 shows an eight embodiment in partial axial section;

FIG. 16 is a plan view of the squeezer of FIG. 15;

FIG. 17 shows a ninth embodiment in side elevation, partially broken away;

FIG. 18 is a plan view of a tenth embodiment similar to the ninth embodiment;

FIG. 19 shows a side view, partially in section of an eleventh embodiment;

FIG. 20 is a plan view of the squeezer of FIG. 19; and

Figure 21:
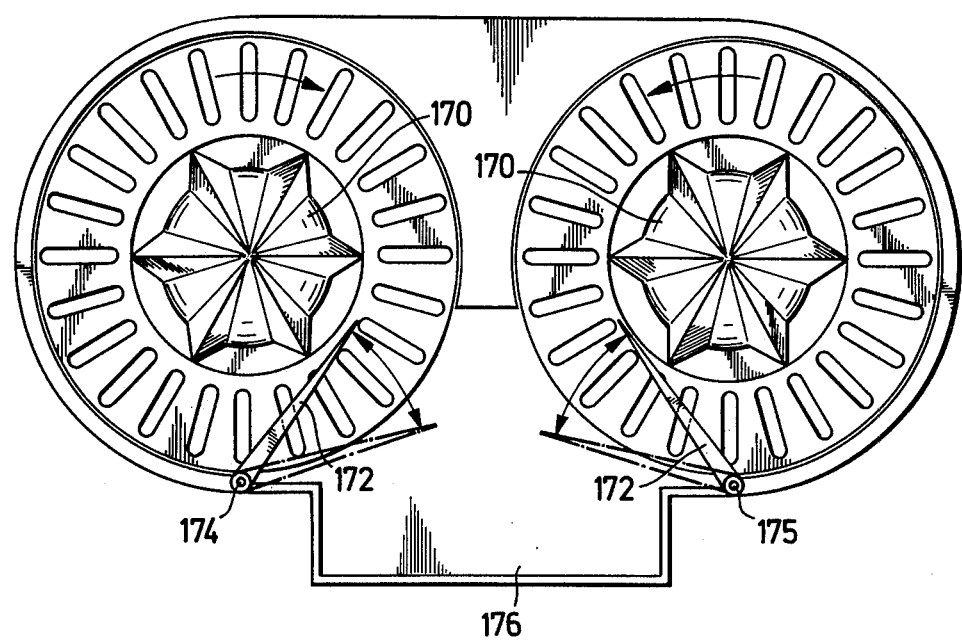

FIG. 21 shows a plan view of a twelfth embodiment.

Figure 1:
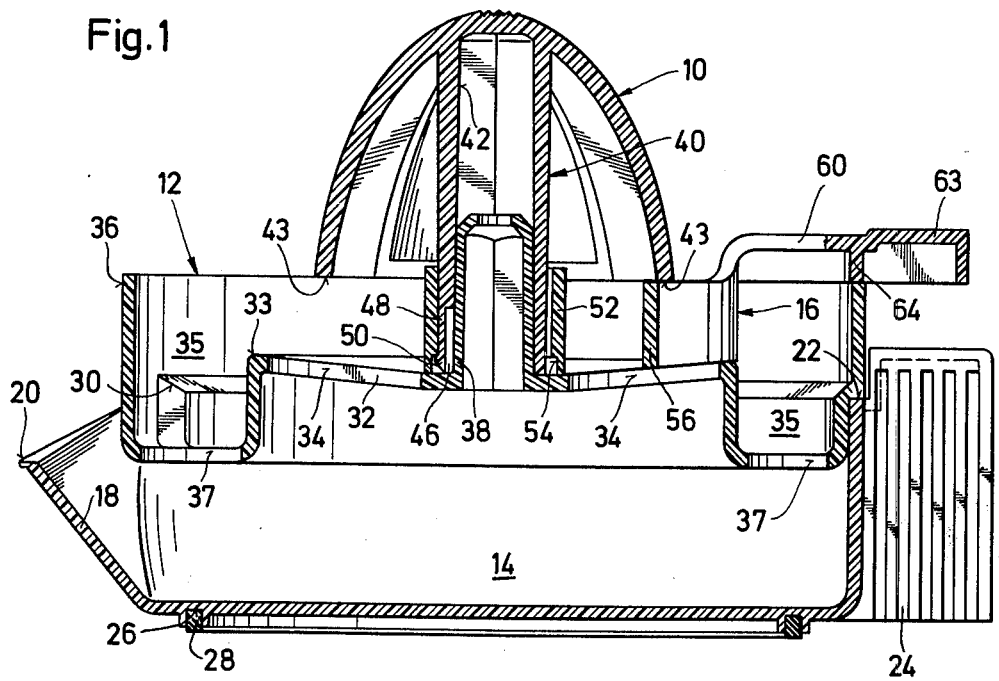
FIG. 1 is a cross-sectional view of the first embodiment, the section line being taken through the centre of the cone.
Figure 2:
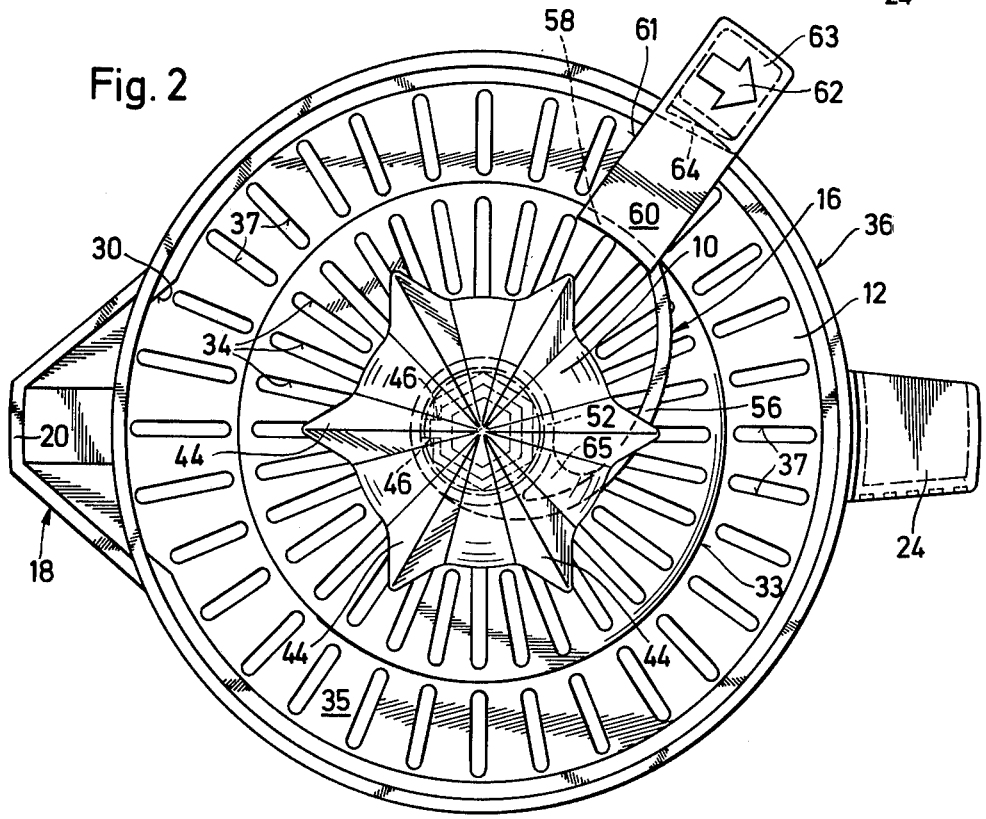
FIG. 2 is a plan view of the squeezer of FIG. 1.

Referring to the drawings, the juice squeezer according to FIGS. 1 and 2 is intended for citrus fruits, which have been halved in the normal manner transversely to the central axis of the fruit. The conventional elements of such a squeezer, that is to say the squeezer body ("cone") 10 in the shape of a half ellipsoid, the strainer 12 and the juice-collecting housing ("dish") 14, are present. A cleaning element 16 is also provided as a fourth element.

The dish 14 has a round plan form with a pouring lip 18, whose drip edge 20 lies below the upper rim 22 of the dish. Opposite to the pouring lip 18 a handle 24, which is open at the sides, is shaped on the dish. This feature also makes for a more simple cleaning since water cannot collect here when the squeezer is cleaned using a dish-washer. An annular groove 26 on the base of the dish 14 accommodates a rubber ring 28 which holds the dish on a table so that it does not slip. The dish is injection-moulded in one piece from a plastics material which is "dishwasher-safe".

The strainer 12 rests on the rim 22 of the dish 14. It cannot rotate relative to the dish 14 owing to a projecting edge 30 which engages in the pouring lip 18 of the dish 14. The strainer 12 has an inner base 32, which slopes downwards slightly towards the centre and is provided with openings 34 in the shape of radial slots, and also an outer annular collector space or waste chamber 35 the base of which its also provided with radial slots 37. A vertically upright strainer rim 36 surrounds the working area of the strainer 12 externally. In the centre of the strainer 12 there is shaped on the base 32 thereof a vertically upright hexagonal head 38. The entire strainer 12 is a one-piece, injection-moulded plastics article made of "dishwasher-safe" material.

On the hexagonal head 38 there is placed the cone 10 which has a support 40 having a corresponding internal hexagonal shape 42. The support 40 terminates near to the top of the cone 10 which is constructed so that it is hollow and whose outer surface is equipped with ribs 44, as is usual for squeezer units of this kind. The external profile of the support 40 is circular and serves as a pivot pin for the cleaning element 16. Parallel to its axis, the support 40 has two slots 46 lying close to one another and the tongue 48 lying between them has on its lower free end a stop projection 50 which projects outwards. The casing section 52 of the cleaning element 16 has, on its lower inner rim, a diameter graduation of complementary size and shape to the projection 50, so that the casing section can be pushed on to the support 40 from below (the tongue being pushed inwards owing to the resilience of the dishwasher-safe plastic used for the one-piece cone 10) until the projection snaps into the peripheral groove 54 formed by the diameter graduation.

A cleaner blade section 56 extends spirally outwards from the casing section 52 of the cleaning element 16. Essentially it has the cross-sectional shape of a narrow, vertically upright rectangle, the lower narrow edge of which sits on the base 32 of the strainer 12, and which is also matched to the slightly sloping course thereof, whilst the upper narrow edge reaches exactly to the lower rim 43 of the cone 10. Near to the casing section 52, there is provided a stabilising flange 65 which prevents a deformation of the cleaning element injected-moulded from plastics during its release from the mould. At the point at which the cleaner blade section 56 meets the outer rim 33 of the strainer base 32, its spiral course becomes a concentric path so that at this point a part denoted as the squeezer section 58 of the cleaning element 16 is provided. A bridging section 60 extends radially outwards and gradually upwards from the upper edge of the cleaning element 16 and projects beyond the rim 36 of the strainer 12, where, on the upper side of a handle 63, an arrow 62 indicates the direction in which the cleaning element is to be rotated. Alternatively, constructional means could be provided which permit the rotation in the correct direction only. On the under-side of the handle 60 another bar 64 projects vertically downwards, and as is apparent from FIG. 2, the bar cuts the rim 36 of the strainer 12 so that, in the area of the rear rim 61 of the handle 60, the bar 64 lies within the rim 36 of the strainer.

The squeezer of FIGS. 1 and 2 is used as follows:

The four individual parts are assembled as shown in FIG. 1. One half of a halved fruit is placed on the cone 10 and in the normal manner turned by hand in one direction, or backwards and forwards, whereby the ribs 44 squeeze out the juice, but, as is known, also tear out a considerable part of the flesh of the fruit, which cannot be used. The juice drips from the cone 10 down onto the strainer base 32 and flows through the radial slots 34 into the dish 14, the slight incline inwards of the strainer base 32 imposing a centrally directed component on the flow direction. The juice accumulates in the dish 14, whose capacity is limited by the level defined by the drip edge 20. The fruit flesh remains on the base 32 of the sieve. In this respect the method of operation does not differ from conventional juice squeezers.

After a few fruits have been squeezed, depending on their quality, the base 32 of the strainer 12 becomes covered with waste flesh which cannot be used. The juice can flow away only with difficulty and saturates the fruit flesh. However, by rotating the cleaning element 16 around the centre in the direction of the arrow the cleaner blade section 56 pushes the fruit flesh outwards until it falls into the collector space 35. Any slight juice residues can still drain away from this space, whereas the base 32 of the strainer 12 which lies on a higher level is empty again so that the juice of the next fruits can flow unhindered through the cleaned strainer. It has been shown that even in the case of considerable differences in the quality of the fruit, the cleaning element 16 clears away the waste flesh cleanly from the base 32 of the strainer 12, without the apertures 34 becoming blocked up. In this manner, the collector space gradually becomes filled with such waste flesh but its maximum capacity has still not been reached even when it is full to its outer rim 33. On the contrary, owing to the squeezing section 58 of the cleaning element 16, the fruit flesh is piled up neatly to the upper edge 36 of the strainer 12, the bar 64 pressing inwards any waste flesh which may possibly show a tendency to fall out. The juice caught in the dish 14 cannot saturate the waste flesh in the collector space 35 since the underside of the collector space is at most at the same level as the drip edge 20.

To clean the squeezer, the assembly of the cone 10 and cleaning element 16 is lifted up off the hexagonal head 38, the strainer 12 is emptied and the component parts of the squeezer may be easily cleaned, for instance in a dishwasher. Since the fruit flesh in the collector space 35 forms a fairly dry, compact cake, it may be easily removed by light tap on the strainer 12.

It may be stated generally that of the four component parts, cone 10, strainer 12, cleaning element 16 and dish 14, apart from the strainer and cleaning element pair, numerous combinations are possible, of which some parts, possibly together, are to be stationary and some parts are to be movable.

Several embodiments are explained in more detail with reference to FIGS. 3 to 21, wherein details already discussed in previously described embodiments do not need to be repeated.

Figure 3:
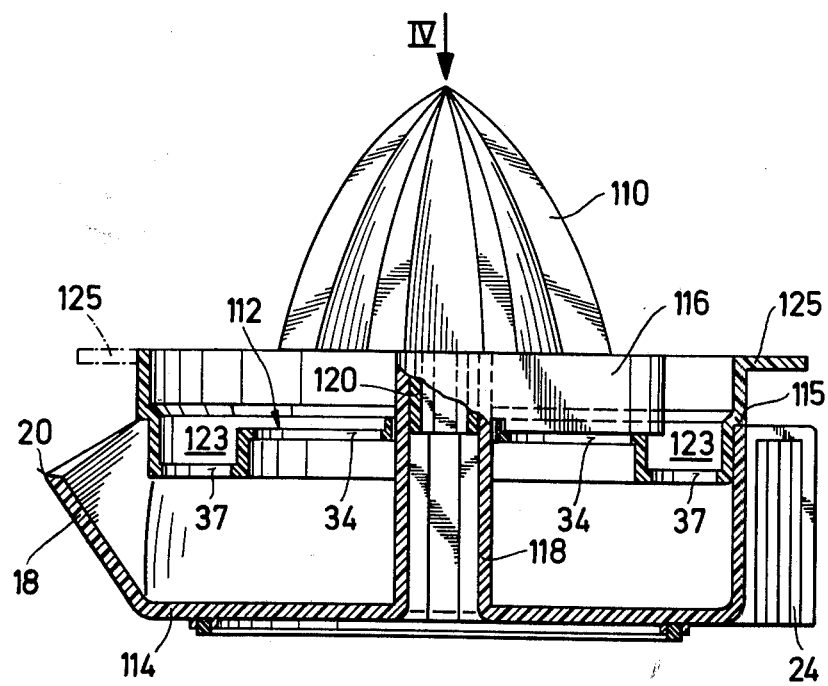
FIG. 3 shows a second embodiment in partial axial secton.
Figure 4:
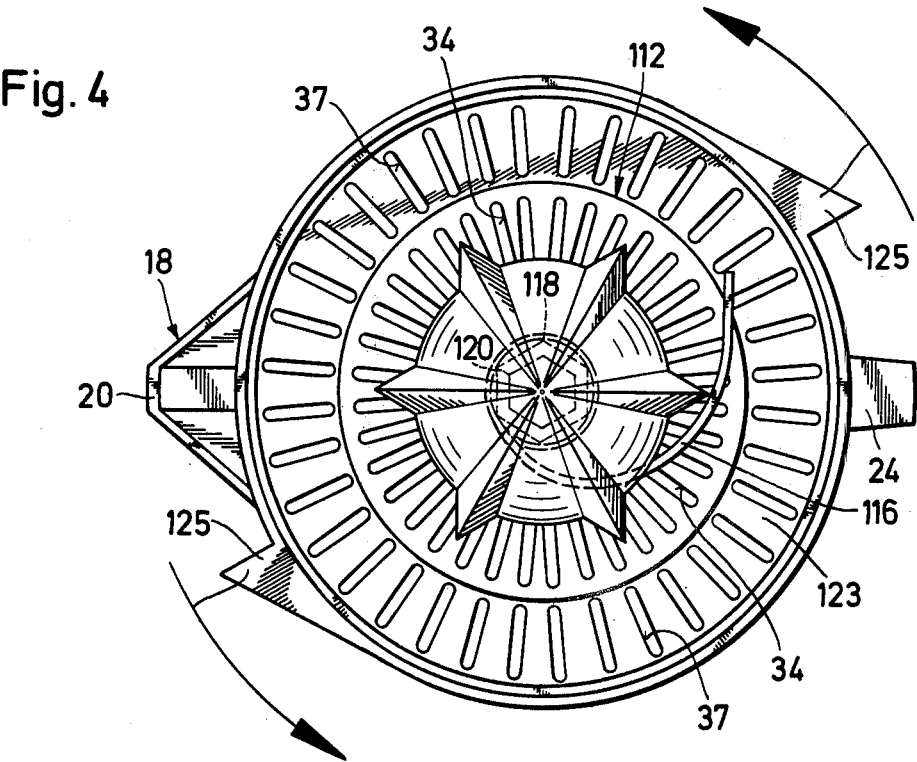
FIG. 4 is a plan view of the squeezer of FIG. 3.

In the squeezer according to FIGS. 3 and 4, a hollow tubular section 118 with an angular internal profile and a cylindrical external shape is shaped on at the centre of a dish 114. A cone 110 is shaped like a mushroom with a short support 120, the profile of which is complementary to the internal profile of the tubular section 118. A strainer 112 sits loosely on the marginal edge 115 of the dish 114 and is also loose with respect to the tubular section 118. A cleaning element 116, which has a spiral shape similar to that in FIGS. 1 and 2, is shaped in one piece on the cone 110. Here too, the strainer 112 has a collector space 123. To clear away the squeezed out waste flesh, the strainer 112 is rotated relative to the stationary assembly of the dish 114, the cone 110 and the cleaning element 116, for which purpose the strainer has one or more handles or grips 125 (two being shown in the drawing). The mode of operation corresponds to that described with reference to the embodiment of FIGS. 1 and 2.

Alternatively, the strainer 112 may be constructed to be stationary with the dish 114, and the cone 110 with the cleaning element 116 movable relative to the stationary assembly. At any rate, to facilitate manipulation, a releasable locking mechanism would then have to be provided between the movable and stationary assemblies; whilst fruit is being squeezed, all parts are locked with respect to one another, and only for the rotating cleaning movement are they disengaged.

According to FIGS. 5 and 6 a one-piece component 200, consisting of a cone 210 and a strainer 212, sits immovably in a dish 214. A cleaning element 216 consists of a guide part 217, which on its underside has a groove 218 in the shape of a sector of a circle. This groove 218 engages over the outer rim 232 of the strainer 212 and a cleaner blade 220, bent in a spiral, projects from the outside inwards to the cone 210. It is obvious that, here, only a circular outer rim 232 of the strainer 212 enables the cleaning element 216 to rotate relative to the stationary assembly 200. The usage is as explained for FIGS. 1 and 2.

FIG. 5a shows a variation of the embodiment according to FIGS. 5 and 6. Here the strainer 212' is provided with an outer rim 232' which is lower and the rim of the dish 214' is likewise drawn upwards to match the height of the rim 232 of the embodiment of FIG. 5. Consequently, the cleaning element 316 does not rest on the rim of the strainer 212', but on the rim of the dish 214. The functions are of course otherwise the same. Rim 232 (FIG. 5) and dish rim 214 (FIG. 5c), respectively, serve thus as a bearing for cleaning element 216.

The embodiment according to FIG. 7 and 8 corresponds substantially to that of FIGS. 1 and 2, but the collector space in this case does not extend around the entire periphery of the strainer 312. On the contrary, two collector spaces 335, each in the shape of a sector of a circle are provided here. The cleaning element 316 does not have a squeezer section, but the spiral cleaning blade section 356 extends right to a point near to the outer rim 336 of the strainer 312 to clean the strainer areas outside the sectors 335 as well.

FIGS. 9 and 10 show an embodiment in which there is provided not just one, but two cones 410 next to one another. This squeezer, which may be used with two hands, is intended to extract the juice of large quantities of fruit within the shortest possible time, wherein, on account of the considerable amount of waste flesh which results, the cleaning element is particularly advantageous.

Again there may be recognised a dish 414 with grip 424 and a pouring lip 418 in which, as described for FIGS. 1 and 2, a strainer 412 rests immovably. The strainer 412 carries a non-circular pin 438 on which the support 440 of the double cone constructed in one piece sits, consequently also immovably. The support 440 is cylindrical outside and serves as a pivot bearing for a cleaning element 416. The external outline of the strainer 412 is circular, whereas the drainage area of the cones 410 is constructed appoximately in the shape of a figure "8," corresponding to the vertical projection of the cones which are disposed somewhat at an angle. The strainer areas outside this drainage area may, therefore, be used for keeping the waste flesh there so that the strainer does not have to be graduated as in the embodiments presented previously. For the same reason, the cleaning element 416 does not need to follow a spiral path but simply has the form of a bar which extends diametrically across the strainer 412. The direction of rotation of the cleaning element is unimportant since two sectors for storing waste flesh are available. Opposite to each other, the rim 412 is provided with inwardly projecting stop sectors 425 which limit the working path of cleaner element 416.

The base 427 of the double cone 410 has proved to be sufficiently rigid to absorb the possibly considerable compressive forces and the moments resulting from them. The distance between the two cones 410 is measured such that even fruit with thick skins, and indeed both halves of the fruit together, may be accommodated. In this area the base 427 is provided with a chamfer 429 so that the juice can run downwards. It is advisable to select this minimal distance so that the squeezer does not have to be made unnecessarily large. It is noticable that in actual fast, in spite of the double cone arrangement, the surface area required is only a little larger than in the case of the embodiments previously described with a cone of the same size.

FIS. 11 and 12 show a model similar to that in FIGS. 9 and 10, but here a cleaning element 450 is integral with a double cone unit 451. The double cone unit 451 forming one piece with the cleaning element 450 is placed on a pin 452 of a strainer 453 so that it can rotate. When fruit halves are being squeezed, the double cone unit 451 is pressed downwards against the pressure of a spring 454, as a result of which the notches 455 on the cleaning element 450 lock into recesses 456 arranged around the circumference of the strainer 453, and thus prevent the two parts from rotating. When the squeezing process is interrupted, the spring 454 lifts the cleaning element 450 up out of the recesses 456 so that it is released for the cleaning process.

In FIGS. 13 and 14 a similar embodiment to that in FIGS. 11 and 12 is shown, in which the locking connection between a one-piece, double-cone, cleaning element 460 and a strainer 461 is produced by a catch 462 hinged on this element. For the cleaning process, the catch 462 merely requires to be lifted up out of a recess 463 of the strainer rim 464, whereby the cleaner 460 becomes rotatable relative to the strainer 461 for the cleaning process.

FIGS. 15 and 16 show an embodiment in which the cleaning element is not rotatable, but movable in a linear fashion. On a dish 514, in this case having a rectangular outline, there rests a strainer 512 with a corresponding outline. A cone 510 is joined to two cross members 511 to form one piece, the cross members in their turn being joined together at their ends by support blocks 513. The cross members run parallel to the longer sides of th dish outline, whilst the support blocks 513 are arranged in vertical alignment with the shorter sides. A groove 515 entering each support block from beneath fits on the shorter, upright rim 536 of the strainer 512, which rim in turn has a flat recess 537 corresponding to the length of the support blocks. In this manner the cross member are secured in a longitudinal and in a transverse direction.

Between the cross members 511 and the strainer 512 there extends transversely to the former a cleaning element 516 in the shape of a straight bar, which at one end has a guide block 517 corresponding to the part 217 in FIGS. 5 and 6. The cleaning element 516 is by this means guided linearly parallel to the cross member 511, and pushes forward the drained fruit flesh into the collector spaces 535 of the strainer 512.

FIG. 17 also shows a squeezer in which two cones 610 are provided. In this case the cones 610 are driven in opposite directions by a motor 611 via a gear arrangement 613. The cones 610 are in each case constructed in one piece with associated strainers 612, which therefore also rotate with them. Beneath each strainer 612 there is arranged a dish 614 with an upright collecting rim 615 and and outlet 617 for the juice. The two dishes 614 are one-piece plastics parts in which the outlets 617 open out at a point common to both.

The collecting rim 615 of each dish 614 has a radial opening 619 such that, in this area, the dish terminates almost flush with the surface of the strainer 612. The two radial openings 619 are located near to the point at which the two dishes 614 are joined. Since the axes of the cones 610 and the strainer 612, as well as at least the bases 607 of the dishes 614, are inclined at an angle to the vertical, the openings 619 consequently lie near to the highest points of the dishes 614 so that the fruit juice does not flow away here but collects at the lowest point of the dishes and is discharged from there through the outlets 617.

The fruit flesh on the other hand collects not at the lowest point of the strainer 612 but is taken round with the strainer until, after passing the radial opening 619, it encounters a cleaning element 616. The waste flesh piles up in front of the cleaning element 616, gives up the remaining juice it still contains and finally "crumbles," when sufficient has accumulated, through the openings 619 beneath which there is a waste container (not shown). Each opening 619 extends over a sector in which the width of the opening is larger than the average distance between the cones 610 and the rim 615 of the dish. Otherwise the fruit flesh would fall down not at the sides but would pile up further back.

In this embodiment the cleaning element 616 is placed on the plastics part forming the two dishes 614, so that it can be detached for taking apart the squeezer (for placing in a dishwasher) after which the cones 610 are lifted off the gear arrangement 613 and the dish part can be removed.

FIG. 18 shows an embodiment which in principle is similar, so that the same reference numerals used in FIG. 17 are used. The differences lie in the construction of the cleaning element 616 and the strainers 612 as well as of the housing 614.

In the area of the openings 621 the housing rim 623 is still somewhat high so that no juice can flow over it. So that the fruit flesh can still reach the container 635, nubs 633, which carry the flesh along, are formed on the strainers 612. The active arms 640 of the cleaning element 616 have openings for the nubs 633 to pass through.

A guide bar 642 of the cleaning element 616 extends into a corresponding guide means of the housing 614 and slides inside this. On the other side of the arms 640 there is shaped a grip 644 for the execution of this movement. When pulling out the cleaning element 616, in the direction of the arrow 646, the waste flesh still piled up in front of the arms 640 is pushed into the container 635, and the cones 610 with the strainers 612 and the housing 614 may be taken off. FIGS. 19 and 20 also show a motor-driven squeezer. It differs from the squeezer shown in FIGS. 17 and 18 in that in this case the strainers 712 are stationary with a housing 714. A cleaning element 716 of each cone 710 is made in one piece with the latter and driven by a motor 700 via gears 711. It may also be driven at a number of revolutions which is less than the number of revolutions of the cone, or may rotate only intermittently. So that the juice is not discharged through openings 719 in the housing base with the fruit flesh, each strainer 712 has yet another low rim 715. The spiral shape of the cleaning element 716 is already known from FIGS. 1 and 2, but here an inverse curve is provided at the end of each element, as the fruit flesh in the outer areas is to be pushed forwards to the openings 719.

FIG. 21 shows a squeezer in plan view, likewise motor-driven. Two cones 170 are formed integrally with their strainers. The corresponding cleaning elements 172 are in the form of flaps which are pivoted near to the outer rim of the housing about bearings 174, 175. The swivel movement to clear away the flesh of the fruit which has piled up, into the waste container 176, may be initiated intermittently by controlling cams or in another manner, as long as the flaps are in their inner position, shown by a solid line.

The connection between the cones and the output shafts of the gears in FIGS. 17 to 20 can be effected by means of universal joint shafts, bending shafts or other means, which enable the entire housing with the cones mounted in it and, optionally the strainers, to be removed from the motor-gear unit as an assembly.

What we claim is:

1. A juice squeezer for squeezing citrus fruits, the squeezer comprising a generally conical squeezer member, a strainer beneath the squeezer member for retaining the flesh of the fruit squeezed out with the juice, a juice-collecting housing supporting the strainer, and a cleaning element overlying the strainer for clearing away the flesh of the fruit retained by the strainer from the immediate area of the squeezer member from which the juice is drained, the cleaning element being movable and all of the squeezer member, the strainer and the collecting housing are stationary.

2. A juice squeezer as claimed in claim 1, and flesh-receiving means including an upright wall bounding a collecting space remote from said immediate area of the strainer to accept and retain such flesh diverted by the cleaning element from said immediate area.

3. A juice squeezer as claimed in claim 2, and the upright blade portion of the elongate cleaning element engaging said immediate area of the strainer to scrape the flesh therefrom and having an upright face to push and guide the flesh out of said immediate area.

4. A juice squeezer as claimed in claim 1, wherein the collecting housing has a guide means for the movable cleaning element.

5. A juice squeezer as claimed in claim 1, wherein the cleaning element is movable and the strainer has a guide means for the movement of the cleaning element.

6. A juice squeezer as claimed in claim 1, wherein a support carries the squeezer member spaced significantly above the strainer to define a free space between the squeezer member and the strainer, the cleaning element extending into said free space.

7. A juice squeezer as claimed in claim 6, wherein said cleaning element is rotatable and the support defines a pivot bearning for said rotatable cleaning element.

8. A juice squeezer as claimed in claim 7, wherein the cleaning element extends outwards from the support in an approximately spiral shape.

9. A juice squeezer as claimed in claim 1, and a circular guide means stationary with the housing and on which the cleaning element is rotatably mounted.

10. A juice squeezer as claimed in claim 1, and the strainer being stationary and having a second portion adjacent said immediate area and remote from the squeezer member and receiving, storing and draining the flesh diverted from said immediate area.

11. A juice squeezer as claimed in claim 1, wherein the cleaning element is constructed as a bar, with a substantially rectangular cross-section, the larger side of which is oriented substantially parallel to the axis of the squeezer member.

12. A juice squeezer as claimed in claim 1, wherein the cleaning element has an actuation grip.

13. A juice squeezer as claimed in claim 1, wherein the strainer has a collector space adjacent said immediate area for the flesh of the fruit cleared away by the cleaning element.

14. A juice squeezer as claimed in claim 13, wherein the collector space is formed by a depression at the periphery of the strainer, the strainer having a circular shape.

15. A juice squeezer as claimed in claim 13, wherein the collector space itself has a strainer base.

16. A juice squeezer as claimed in claim 1, and pivot means between the strainer and cleaning element, the cleaning element being rotational about said pivot means.

17. A juice squeezer as claimed in claim 1 and including means defining a collector space adjacent said immediate area and adjacent the cleaning element to receive the flesh diverted out of said immediate area.

18. A juice squeezer as claimed in claim 12, wherein to the cleaning element there is joined a bridging section at the free end of which there is provided said actuation grip.

19. A juice squeezer as claimed in claim 14, wherein the collecting housing has a pouring lip whose rim lies below said immediate area of the strainer.

20. A juice squeezer as claimed in claim 1, wherein the cleaning element is a straight bar rotatable between two stops, and the angle of traverse, restricted by the stops, includes the area beneath the squeezer member.

21. A juice squeezer as claimed in claim 1, wherein a pair of squeezer members of the same size and shape are provided and wherein the two squeezer members may be used for simultaneous squeezing with both hands of approximately similar sized halves of fruit with approximately the same expenditure of force and time.

22. A juice squeezer as claimed in claim 21, wherein the squeezer members have a support common to both which is constructed at the same time as pivot bearing for the cleaning element.

23. A juice squeezer as claimed in claim 21, wherein the squeezer members of the pair are arranged with the tops of the cones pointing away from one another.

24. A juice squeezer as claimed in claim 21, wherein a common cleaning element is associated with all the squeezer members.

25. A juice squeezer as claimed in claim 1, wherein the squeezer member, the strainer, the cleaning element and the juice-collecting housing are made of dishwasher-safe plastics material.

26. A juice squeezer as claimed in claim 1, further including means defining a waste chamber disposed outwardly of said immediate area of the strainer for collecting the waste flesh moved by said cleaning element.

27. A juice squeezer as claimed in claim 26, wherein the cleaning element is mounted on a guide means stationary with the juice-collecting housing so that said cleaning element can slide.

28. A juice squeezer as claimed in claim 26, wherein the cleaning element is pivoted on a post disposed centrally with respect to the juice-collecting housing so that said cleaning element can swivel.

29. A juice squeezer for squeezing citrus fruits, the squeezer comprising a generally conical squeezer member, a strainer beneath the squeezer member for retaining the flesh of the fruit squeezed out with the juice, a juice-collecting housing beneath the strainer, an elongate cleaning element overlying and engaging the strainer and having an upright blade portion traversing the strainer in the immediate area adjoining the squeezer member from which the juice is drained, the strainer and cleaning element having relative movement with respect to each other in a direction generally transverse to the elongate cleaning element to effectively sweep the cleaning element over said immediate area of the strainer and divert the flesh out of said immediate area to maintain the strainer open and unobstructed by flesh in the immediate area of the squeezer member, the strainer having a collector space adjacent said immediate area for the flesh of the fruit cleared away by the cleaning element, the collector space being formed by a depression at the periphery of the strainer, the strainer having a circular shape, the strainer having a circular rim between said immediate area and the collector space, the cleaning element extending almost to the rim between the strainer and the collector space, and the cleaning element having a squeezer section adjacent the rim which runs approximately concentrically to the rim.

30. A juice squeezer as claimed in claim 29, wherein the strainer is constructed so that it slopes downwards at an angle inwards from its rim.

31. A juice squeezer for squeezing citrus fruits, the squeezer comprising a generally conical squeezer member, a strainer beneath the squeezer member for retaining the flesh of the fruit squeezed out with the juice, a juice-collecting housing beneath the strainer, an elongate cleaning element overlying and engaging the strainer and having an upright blade portion traversing the strainer in the immediate area adjoining the squeezer member from which the juice is drained, the strainer and cleaning member having relative movement with respect to each other in a direction generally transverse to the elongate cleaning element to effectively sweep the cleaning element over said immediate area of the strainer and divert the flesh out of said immediate area to maintain the strainer open and unobstructed by flesh in the immediate area of the squeezer member, the strainer having an upstanding pin with a non-circular periphery, the squeezer member having a mounting socket to receive said pin, the socket having a complementary non-circular shape to closely fit the pin so that the squeezer member cannot rotate relative to the strainer.

* * * * *